(12) United States Patent
Nicholson

(10) Patent No.: US 10,091,476 B2
(45) Date of Patent: Oct. 2, 2018

(54) REDUCED BLEND ARTIFACTS IN A MULTIPLE DIGITAL PROJECTOR SYSTEM

(71) Applicant: CHRISTIE DIGITAL SYSTEMS USA, INC., Cypress, CA (US)

(72) Inventor: Stuart James Myron Nicholson, Waterloo (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 0 days.

(21) Appl. No.: 15/082,604

(22) Filed: Mar. 28, 2016

(65) Prior Publication Data

US 2017/0280119 A1    Sep. 28, 2017

(51) Int. Cl.
   *H04N 5/74*     (2006.01)
   *H04N 9/31*     (2006.01)
(52) U.S. Cl.
   CPC ......... *H04N 9/3185* (2013.01); *H04N 9/3123* (2013.01); *H04N 9/3147* (2013.01)
(58) Field of Classification Search
   CPC .................................................... H04N 9/3129
   USPC ........................................................ 348/750
   See application file for complete search history.

(56) References Cited

U.S. PATENT DOCUMENTS

| 2007/0097334 A1* | 5/2007 | Damera-Venkata ........................ H04N 9/3147 353/94 |
| 2008/0259223 A1 | 10/2008 | Read et al. |
| 2015/0172646 A1* | 6/2015 | Smithwick ......... H04N 13/0459 348/51 |
| 2016/0165198 A1* | 6/2016 | Ouchi .................. H04B 9/3182 348/744 |
| 2017/0018232 A1* | 1/2017 | Nicholson .............. G09G 3/002 |

OTHER PUBLICATIONS

Van Kessel, Peter F. "Electronics for DLP/sup TM/technology based projection systems." VLSI Circuits, 2001. Digest of Technical Papers. 2001 Symposium on. IEEE, 2001.
Extended European Search Report dated Aug. 22, 2017, by EPO, re European Patent Application No. 17161796.

* cited by examiner

*Primary Examiner* — Jefferey F Harold
*Assistant Examiner* — Sihar Karwan
(74) *Attorney, Agent, or Firm* — Perry + Currier, Inc.

(57) ABSTRACT

Techniques for reducing blend artifacts in a multiple digital projector system are provided, including a first and second projector, having respective projection fields which overlap in a blend zone and one or more control devices configured to: for a given pixel of a common image frame projected by both the first projector and the second projector in the blend zone, the given pixel of the common image frame comprising a plurality of bitplanes arranged in a sequence, control the first projector to project a first portion of the plurality of bitplanes according to the sequence; and control the second projector to project a second portion of the plurality of bitplanes according to the sequence, the second portion complementary to the first portion, such that in the common image frame only one of the first projector and the second projector projects any given bitplane of the plurality of bitplanes.

20 Claims, 5 Drawing Sheets

300

301
For A Given Pixel Of A Common Image Frame Projected By Both The First Projector And The Second Projector In The Blend Zone, The Given Pixel Of The Common Image Frame Comprising A Plurality Of Bitplanes Arranged In A Sequence, Control The First Projector To Project A First Portion Of The Plurality Of Bitplanes According To The Sequence

303
Control The Second Projector To Project A Second Portion Of The Plurality Of Bitplanes According To The Sequence, The Second Portion Complementary To The First Portion, Such That In The Common Image Frame Only One Of The First Projector And The Second Projector Projects Any Given Bitplane Of The Plurality Of Bitplanes

Fig. 3

REDUCED BLEND ARTIFACTS IN A MULTIPLE DIGITAL PROJECTOR SYSTEM

FIELD

The specification relates generally to projectors, and specifically to reducing blend artifacts in a multiple digital projector system.

BACKGROUND

When images from multiple digital projectors are overlapped, images may not appear uniform because the brightness in the overlap, referred to as a blend zone, is higher than that in the areas where only one projector is forming the image. The overlap is referred to as a blend zone as the images from each of the projectors are blended together in the blend zone. Image brightness in blend zones is often managed through a combination of electronic and optical blending. In optical blending optical elements (such as filters) are used to adjust the brightness of each image. In electronic blending, the brightness of each image is adjusted so that when overlapped a constant brightness is presented to the viewer across the overlap region. Unfortunately, with electronic blending it is possible that a viewer's eyes, when moving (e.g. saccading) quickly across the blend region, see bands of brightness and/or darkness and/or colors. These blend zone artifacts distract from the image and reveal the multiple projectors used to construct the final image.

SUMMARY

In general, this disclosure is directed to a system in which digital projectors are coordinated to project bitplanes in a blend zone such that only one projector is projecting a bitplane of a given pixel at any one time. For example, each projector is controlled to project a common image frame in a blend zone, and for each given pixel of the common image frame, which is made up a of a plurality of bitplanes to be projected in a sequence: each projector projects a respective portion of the plurality of bitplanes in the sequence such that only one of the projectors is projecting any given bitplane of the plurality of bitplanes at any time. In other words, bitplanes are projected in a sequence that is distributed between the projectors, such that bitplanes projected by each projector do not overlap.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

An aspect of the specification provides a system comprising: a first projector and a second projector having respective projection fields which overlap in a blend zone, and one or more control devices configured to: for a given pixel of a common image frame projected by both the first projector and the second projector in the blend zone, the given pixel of the common image frame comprising a plurality of bitplanes arranged in a sequence, control the first projector to project a first portion of the plurality of bitplanes according to the sequence; and control the second projector to project a second portion of the plurality of bitplanes according to the sequence, the second portion complementary to the first portion, such that in the common image frame only one of the first projector and the second projector projects any given bitplane of the plurality of bitplanes.

The one or more control devices can comprise a first control device at the first projector, a second control device at the second projector, and one or more system control devices in communication with the first control device and the second control device, the one or more system control devices configured to: transmit, to the first control device and the second control device, the common image frame and associated data indicating a respective geometry of each of the first projector and the second projector with respect to the blend zone, each of the first control device and the second control device configured to control a respective projector to project a respective portion of the plurality of the bitplanes according to the respective geometry, such that in the common image frame only one of the first projector and the second projector projects any given bitplane of the plurality of bitplanes.

Each of the first projector and the second projector can be controlled to project a respective portion of the plurality of bitplanes in the sequence according to a blend coefficient determined from associated data indicating a respective geometry of each of the first projector and the second projector with respect to the blend zone.

The one or more control devices can be further configured to: for each of all pixels of the common image frame projected by both the first projector and the second projector in the blend zone, all the pixels including the given pixel, each of the pixels of the common image frame comprising a plurality of respective bitplanes arranged in a respective sequence: control the first projector to project a respective first portion of the plurality of respective bitplanes according to the respective sequence; and control the second projector to project a respective second portion of the plurality of respective bitplanes according to the respective sequence, the respective second portion complementary to the respective first portion, such that for each of the pixels in the common image frame only one of the first projector and the second projector projects any given respective bitplane of the plurality of respective bitplanes.

The one or more control devices can be further configured to control each of the first projector and the second projector to interleave the first portion and the second portion of the plurality of bitplanes according to the sequence.

The one or more control devices can be further configured to dither adjacent bitplanes for each of the first projector and the second projector in the blend zone.

Each of the first projector and the second projector can comprise one or more of a digital projector, a DMD (digital multimirror projector) based projector and an LCOS (liquid crystal on silicon) projector operated in an on-off mode.

Each of the first projector and the second projector can be configured to mask bitplanes that are not to be projected.

Each of the first projector and the second projector can be controlled to project a respective portion of the plurality of bitplanes in the sequence according to a round-robin.

The system can further comprise a plurality of projectors, including the first projector and the second projector, each having a respective projection field which at least partially overlap in the blend zone, the given pixel of the common image frame projected by each of the plurality of projectors in the blend zone, the given pixel of the common image frame comprising the plurality of bitplanes arranged in the sequence, and the one or more control devices can be further configured to: control each of the plurality of projectors to project a respective portion of the plurality of bitplanes according to the sequence, each of the respective portions being complementary to all others of the respective portions, such that in the common image frame only one of the plurality of projectors projects any given bitplane of the plurality of bitplanes.

An aspect of the specification provides a method comprising: at a system comprising: first projector and a second projector having respective projection fields which overlap in a blend zone, and one or more control devices, for a given pixel of a common image frame projected by both the first projector and the second projector in the blend zone, the given pixel of the common image frame comprising a plurality of bitplanes arranged in a sequence, controlling, using the one or more control devices, the first projector to project a first portion of the plurality of bitplanes according to the sequence; and controlling, using the one or more control devices, the second projector to project a second portion of the plurality of bitplanes according to the sequence, the second portion complementary to the first portion, such that in the common image frame only one of the first projector and the second projector projects any given bitplane of the plurality of bitplanes.

The one or more control devices can comprise a first control device at the first projector, a second control device at the second projector, and one or more system control devices in communication with the first control device and the second control device, and the method can further comprise: transmitting, using the one or more system control devices, to the first control device and the second control device, the common image frame and associated data indicating a respective geometry of each of the first projector and the second projector with respect to the blend zone, each of the first control device and the second control device configured to control a respective projector to project a respective portion of the plurality of the bitplanes according to the respective geometry, such that in the common image frame only one of the first projector and the second projector projects any given bitplane of the plurality of bitplanes.

Each of the first projector and the second projector can be controlled to project a respective portion of the plurality of bitplanes in the sequence according to a blend coefficient determined from associated data indicating a respective geometry of each of the first projector and the second projector with respect to the blend zone.

The method can further comprise: for each of all pixels of the common image frame projected by both the first projector and the second projector in the blend zone, all the pixels including the given pixel, each of the pixels of the common image frame comprising a plurality of respective bitplanes arranged in a respective sequence: controlling, using the one or more control devices, the first projector to project a respective first portion of the plurality of respective bitplanes according to the respective sequence; and controlling, using the one or more control devices, the second projector to project a respective second portion of the plurality of respective bitplanes according to the respective sequence, the respective second portion complementary to the respective first portion, such that for each of the pixels in the common image frame only one of the first projector and the second projector projects any given respective bitplane of the plurality of respective bitplanes.

The method can further comprise controlling, using the one or more control devices, each of the first projector and the second projector to interleave the first portion and the second portion of the plurality of bitplanes according to the sequence.

The method can further comprise dithering, using the one or more control devices, adjacent bitplanes for each of the first projector and the second projector in the blend zone.

Each of the first projector and the second projector can be configured to mask bitplanes that are not to be projected.

Each of the first projector and the second projector can be controlled to project a respective portion of the plurality of bitplanes in the sequence according to a round-robin.

The system further can comprise a plurality of projectors, including the first projector and the second projector, each having a respective projection field which at least partially overlap in the blend zone, the given pixel of the common image frame projected by each of the plurality of projectors in the blend zone, the given pixel of the common image frame comprising the plurality of bitplanes arranged in the sequence, and the method can further comprise: controlling, using the one or more control devices, each of the plurality of projectors to project a respective portion of the plurality of bitplanes according to the sequence, each of the respective portions being complementary to all others of the respective portions, such that in the common image frame only one of the plurality of projectors projects any given bitplane of the plurality of bitplanes.

A further aspect of the specification provides a computer-readable medium storing a computer program, wherein execution of the computer program is for: at a system comprising: first projector and a second projector having respective projection fields which overlap in a blend zone, and one or more control devices, for a given pixel of a common image frame projected by both the first projector and the second projector in the blend zone, the given pixel of the common image frame comprising a plurality of bitplanes arranged in a sequence, controlling, using the one or more control devices, the first projector to project a first portion of the plurality of bitplanes according to the sequence; and controlling, using the one or more control devices, the second projector to project a second portion of the plurality of bitplanes according to the sequence, the second portion complementary to the first portion, such that in the common image frame only one of the first projector and the second projector projects any given bitplane of the plurality of bitplanes. The computer-readable medium can comprise a non-transitory computer-readable medium.

BRIEF DESCRIPTIONS OF THE DRAWINGS

For a better understanding of the various implementations described herein and to show more clearly how they may be carried into effect, reference will now be made, by way of example only, to the accompanying drawings in which:

FIG. 3 depicts a block diagram of a flowchart of a method for blending overlapping images, according to non-limiting implementations.

DETAILED DESCRIPTION

Figure 1:
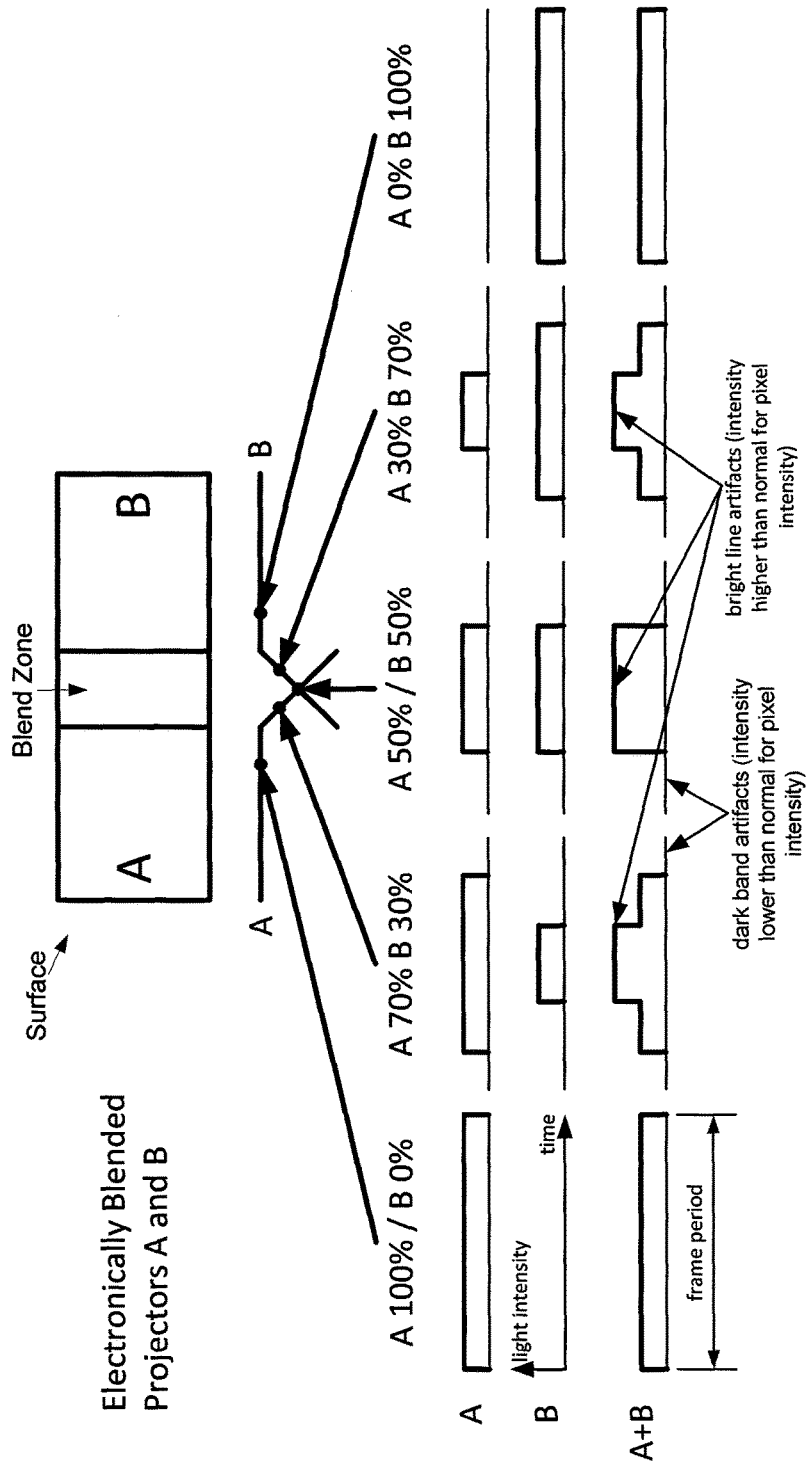
FIG. 1 depicts a blending scheme for blending overlapping images in blend zone according to the prior art.

Attention is first directed to FIG. 1, which depicts a blending scheme according to the prior art. It is assumed in FIG. 1 that a projector A and a projector B are each projecting a respective image A, B onto a surface (e.g. a screen and the like) and images A and B overlap in a blend zone. It is further assumed that the portion of each of images A, B in the blend zone are the same, e.g. a common image, and further that projector A and projector B are being controlled to blend the common image of images A, B together in the blend zone. According to the depicted blend scheme, the contribution from projector A decreases linearly (i.e. left-to-right, from pixel to pixel) in the blend zone as a function of pixel position, while the contribution from projector B increases linearly (i.e. left-to-right, from pixel to pixel) in the blend zone as a function of pixel position. Hence, for example, in a region of the blend zone where projector A provides 70% of the brightness of the common image, projector B provides 30% of the brightness of the common image; similarly, in a region of the blend zone where projector A provides 50% of the brightness of the common image (e.g. about half way), projector B provides 50% of the brightness of the common image; and in a region of the blend zone where projector A provides 30% of the brightness of the common image (e.g. about half way), projector B provides 70% of the brightness of the common image.

FIG. 1 also depicts how light is projected by each of projectors A, B in a common frame period for a given pixel in each of the 70/30, 50/50, 30/70 regions: for example, the light intensity vs. time graphs generically show bitplanes projected by each of projector A, B for a single pixel in each region (as well as outside the blend zone).

Specifically, in a given frame period, the portion of the common image projected by each of projector A and projector B are overlaid onto each other. For example. In the region where projector A provides 70% of the brightness, and projector B provides 30% of the brightness, projector A is controlled to project at 100% of the brightness of the frame, but for 70% of the time, and similarly, projector B is controlled to project at 100% of the brightness of the frame, but for 30% of the time; furthermore, there is no coordination between when each projector is projecting the respective portion of the frame, so that the image from projector A is projected simultaneously with the image from projector B.

This leads to the appearance of bright/dark/colored bands in the blend zone as the light from each projector "piles up" due to two overlapping pixels: one pixel projected by projector A at, for example, 100% intensity, for 70% of the frame period overlapping with a second pixel at 100%, for 30% of the frame period, rather than a single pixel at 100% intensity for 100% of the frame period, as occurs outside the blend zone. Whereas the 100% intensity pixel would use all bitplanes, resulting in a fixed intensity level over the frame time, the 30% intensity pixel uses some bitplanes, and the 70% intensity pixel uses many, and/or all, of those bitplanes and some additional bitplanes. When overlaid onto each other, the effective light is twice the intensity during the 30% bitplanes, reduced to normal intensity for the 70%-only bitplanes, and then dark for the remaining bitplanes. This can appear as a bright band during the 30% bitplanes and a dark band for the remaining bitplanes if the viewer's eye moves across the blend zone. It is further noted that in some situations, bitplanes can be turned on and off in different orders and/or the bitplanes can be reordered according to a scheme not based solely on intensity. Regardless, such bright and dark bands can still occur in these schemes.

A similar problem occurs even for the 50/50 projection region where all the light piles up into one region, leading to one bright band that is twice the desired intensity, and dark bands on either side of the bright band. In other words, in the 50/50 projection region, each projector A, B simultaneously projects its respective portion of a pixel.

To address this problem, described herein is a blending scheme in which, instead of reducing pixel intensities within a blend region prior to bitplane selection, a time based scheme is used, where bitplanes are selected for the full pixel intensity and then bitplanes are "masked off" at each projector such that only one projector within a blend zone illuminates a particular bitplane.

Thus, modifying the scheme of FIG. 1 at, for example, the 50/50 projection region, both projector A and projector B can convert the 100% pixel intensity to bitplanes, but projector A turns on half of the bitplanes while projector B turns on the other half; furthermore, projection by each projector A, B is synchronized such that only one of projector A and projector B is projecting a bitplane for a given pixel at any given time. Similarly, for the 70/30 projection region, both projector A and B convert the 100% pixel intensity to bitplanes, but projector A turns on 70% of the bitplanes while projector B turns on the remaining 30%, the two sets of bitplanes projected by each projector A, B being complimentary to each other; in other words, projection by each projector A, B is synchronized such that only one of projector A and projector B is projecting a bitplane for a given pixel at any given time. As will be described herein, such a scheme can reduce the above-described banding, and leads a viewer to see continuous light.

Figure 2:
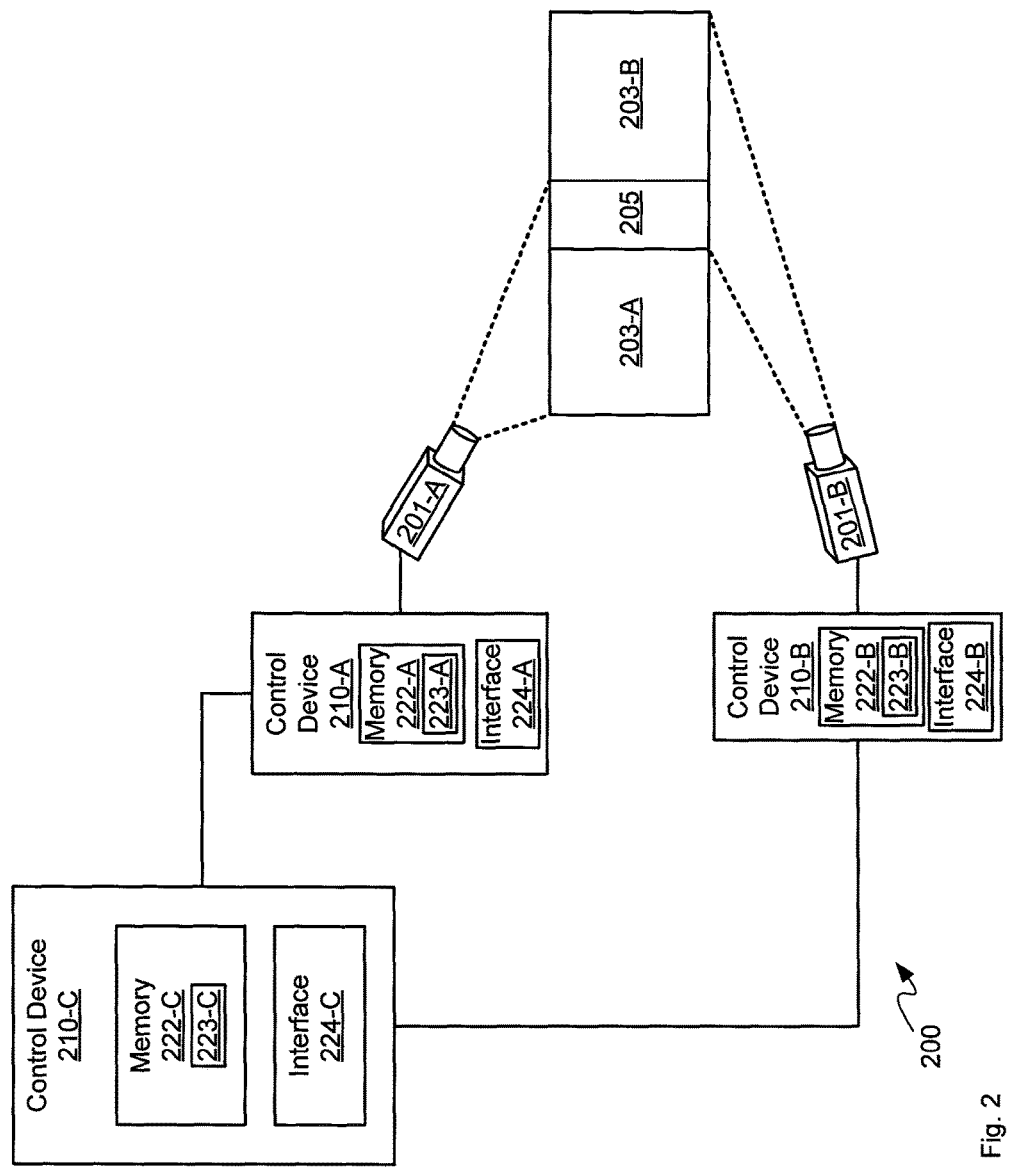
FIG. 2 depicts a system for blending overlapping images according to non-limiting implementations.

Attention is next directed to FIG. 2 which depicts a system 200 comprising: a first projector 201-A and a second projector 201-B having respective projection fields 203-A, 203-B which overlap in a blend zone 205, and one or more control devices 210-A, 210-B, 210-C configured to: for a given pixel of a common image frame projected by both first projector 201-A and second projector 201-B in blend zone 205, the given pixel of the common image frame comprising a plurality of bitplanes arranged in a sequence, control the first projector 201-A to project a first portion of the plurality of bitplanes according to the sequence; and control the second projector 201-B to project a second portion of the plurality of bitplanes according to the sequence, the second portion complementary to the first portion, such that in the common image frame only one of the first projector 201-A and second projector 201-B projects any given bitplane of the plurality of bitplanes. This scheme will be described in further detail below.

Furthermore, as depicted, one or more control devices 210-A, 210-B, 210-C includes a first control device 210-A at first projector 201-A, a second control device 210-B at second projector 201-B, and a system control device 210-C (including one or more system control devices) in communication with the first control device 210-A and the second control device 210-B via respective communication links, which can be wired or wireless as desired. Components of each of first control device 210-A and second control device 210-B can be integrated with and/or separate from, each respective projector 201-A, 201-B.

As depicted, control device 210-A comprises a memory 222-A storing an application 223-A and an interface 224-A;

control device 210-B comprises a memory 222-B storing an application 223-B and an interface 224-B; and control device 210-C comprises a memory 222-C storing an application 223-C and an interface 224-C.

For simplicity, first projector 201-A and second projector 201-B will be interchangeably referred to hereafter, collectively, as projectors 201, and generically as a projector 201. Similarly, projection fields 203-A, 203-B will be interchangeably referred to hereafter, collectively, as a projection field 203, and generically as a projection field 203. Similarly, one or more control devices 210-A, 210-B, 210-C will be interchangeably referred to hereafter, collectively, as control devices 210, and generically as a control device 210. Similarly, memory 222-A, 222-B, 222-C will be interchangeably referred to hereafter, collectively, as memory 222, and generically as a memory 222. Similarly, applications 223-A, 223-B, 223-C will be interchangeably referred to hereafter, collectively, as applications 223, and generically as an application 223. Similarly, interfaces 224-A, 224-B, 224-C will be interchangeably referred to hereafter, collectively, as interfaces 224, and generically as an interface 224.

System control device 210-C can include, but is not limited to, one or more of a content player, an image generator, and image renderer, and the like which processes and/or "plays" and/or generates image data, for example by producing projection data suitable for processing and projection by each projector 201 and an associated control device 210-A, 210-B. For example, such image data (not depicted) can include, but is not limited to, one or AVI files, one or more JPG files, a PNG file, and the like. Projection data can include, but is not limited to, HDMI data, VGA data, and/or video transport data. In other words, control device 210-C can process image data to produce respective projection data which is transmitted to each control device 210-A, 210-C, each of which, in turn, processes the respective projection data into a format suitable for projection by a respective projector 201. In particular, as described in detail below, the data transmitted to each control device 210-A, 210-C is not necessarily the same, but rather is specific to each associated projector 201, for example to indicate a respective geometry of each projector 201. Furthermore, system 200 can further include one or more system control devices similar to device 210-C (e.g. including a plurality of system control devices); in these implementations, each projector 201 can receives images from an image generator and/or system control device dedicated to that projector 201. Such implementations can include a host controller computing device that co-ordinates the output of the image generators (e.g. such a host controller computing device can also be referred to as a system control device that controls other system control devices, that are each, in turn, dedicated to controlling a given projector). In other words, a wide variety of system control architectures are within the scope of present implementations.

Control device 210-C can hence comprise, for example, a server and the like, configured to generate and/or render images as image data. Alternatively, control device 210 can generate image data using algorithms, and the like, for generating images.

Each control device 210-A, 210-B can comprise a respective control device integrated with each projector 201.

Each projector 201 comprises a digital projector configured to digitally project images and control brightness of pixels in projected images using bitplanes. While present implementations contemplate that each projector 201 comprises one or more of a DLP™ (digital light processing) DMD (digital multimirror device) based projector, other types of projection technologies that use bitplanes to control brightness are within the scope of present implementations. For example, one or more of projectors 201 can include an LCOS (Liquid Crystal on Silicon) based projector, and the like, but operated in an on-off mode, such that each pixel is either "on" or "off" and a brightness of each pixel controlled using bitplanes, similar to operation of a DMD based digital projector.

Furthermore, while only two projectors 201 are depicted, system 200 can comprise a plurality of projectors 201 and/or three or more projectors, each configured to project respective projection data comprising, for example, portions of a larger tiled image to be projected. Indeed, it is assumed that images projected by each projector 201 into a respective projection field 203, and which overlap and are blended together in blend zone 205, together form a tiled image. Indeed, while not depicted, it is assumed that each projection field 203 intersects a surface and/or screen such that the tiled image is projected onto the surface and/or screen.

While not depicted, system 200 can comprise other devices, including, but not limited to, warping devices and the like, configured to warp projection data for projection onto a three-dimensional surface.

Each control device 210, can comprise any suitable computing device, including but not limited to a graphics processing unit (GPU), a graphics processing device, a graphics processing engine, a video processing device, a personal computer (PC), a server, and/or a control device integrated with a respective projector 201, and the like, and each generally comprises a memory 222 and a communication interface 224 (interchangeably referred to hereafter as interface 224) and optionally any suitable combination of input devices and display devices.

Each control device 210 can further comprise a processor and/or a plurality of processors, including but not limited to one or more central processors (CPUs) and/or one or more processing units and/or one or more graphic processing units (GPUs); either way, each control device 210 comprises a hardware element and/or a hardware processor. Indeed, in some implementations, each control device 210 can comprise an ASIC (application-specific integrated circuit) and/or an FPGA (field-programmable gate array) specifically configured to implement the functionality of each control device 210. Hence, each control device 210 is not necessarily a generic computing device and/or a generic processor and/or a generic component, but a device specifically configured to implement specific functionality, as described in further detail below. For example, control devices 210, together, can specifically comprise an engine configured to reduce blend artifacts in a multiple digital projector system using the bitplane projection scheme described herein.

Each memory 222 can comprise a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of each control device 210 as described herein are typically maintained, persistently, in each memory 222 and used by each control device 210 which makes appropriate utilization of volatile storage during the execution of such programming instructions. Those skilled in the art recognize that each memory 222 is an example of computer readable media that can store programming instructions executable on each control device 210. Furthermore, each memory 222 is also an example of a memory unit and/or memory module and/or a non-volatile memory.

In particular, each memory 222 stores a respective application 223, which, when processed by one or more control devices 210, enables the one or more control devices 210 to: for a given pixel of a common image frame projected by both first projector 201-A and second projector 201-B in blend zone 205, the given pixel of the common image frame comprising a plurality of bitplanes arranged in a sequence, control the first projector 201-A to project a first portion of the plurality of bitplanes according to the sequence; and control the second projector 201-B to project a second portion of the plurality of bitplanes according to the sequence, the second portion complementary to the first portion, such that in the common image frame only one of the first projector 201-A and second projector 201-B projects any given bitplane of the plurality of bitplanes.

Furthermore, specific functionality of components of system 200 can be maintained at respective control devices 210. For example, as described above, control device 210-C can further play and/or generate image data to produce projection data specific to a given projector 201, which is in turn transmitted to control devices 210-A, 210-C, each of which configured control a respective projector 201 to project images based on the received projection data.

As present implementations are specifically directed to controlling a common image frame, projected by both projectors 201 into blend zone 205, control device 210-C can further store data related to a geometry of projectors 201; for example, in some implementations, control device 210-C can store data indicative of which portion of respective images to be projected by each projector 201 comprises a common image to be projected into a blend zone. Such data can further be respectively provided to control devices 210-A, 210-B with respective projection data, and each control device 210-A, 210-B can, in turn process the respective projection data into bitplanes, including masking and/or synchronizing projected bitplanes in areas of respective projection data in the blend zone. In some implementations, such data can be stored as bitplane usage coefficients; furthermore, a bitplane mask and/or blending mask for each projector 201 can be generated therefrom.

However, in other implementations, control device 210-C can provide respective projection data to each control device 210-A, 210-B that already includes masking and/or synchronizing projected bitplanes in areas of respective projection data in the blend zone.

Interfaces 224 comprise any suitable wired or wireless communication interfaces which enable control devices 210 to communicate with each other via a respective communication link.

Attention is now directed to FIG. 3 which depicts a flowchart of a method 300 for reducing blend artifacts in a multiple digital projector system, according to non-limiting implementations. In order to assist in the explanation of method 300, it will be assumed that method 300 is performed using system 200, and specifically by control devices 210, for example when each control device 210 processes a respective application 223. Indeed, method 300 is one way in which system 200 and/or control devices 210 can be configured. Furthermore, the following discussion of method 300 will lead to a further understanding of control devices 210, and system 200 and its various components. However, it is to be understood that system 200 and/or control devices 210 and/or method 300 can be varied, and need not work exactly as discussed herein in conjunction with each other, and that such variations are within the scope of present implementations.

Regardless, it is to be emphasized, that method 300 need not be performed in the exact sequence as shown, unless otherwise indicated; and likewise various blocks may be performed in parallel rather than in sequence; hence the elements of method 300 are referred to herein as "blocks" rather than "steps". It is also to be understood, however, that method 300 can be implemented on variations of system 200 as well.

At block 301, control devices 210, for a given pixel of a common image frame projected by both first projector 201-A and second projector 201-B in blend zone 205, the given pixel of the common image frame comprising a plurality of bitplanes arranged in a sequence, control the first projector 201-A to project a first portion of the plurality of bitplanes according to the sequence.

At block 303, control devices 210 (also for the given pixel of the common image frame projected by both first projector 201-A and second projector 201-B in blend zone 205) control the second projector 201-B to project a second portion of the plurality of bitplanes according to the sequence, the second portion complementary to the first portion, such that in the common image frame only one of the first projector 201-A and second projector 201-B projects any given bitplane of the plurality of bitplanes.

Method 300 will now be explained with reference to FIG. 4, which is similar to FIG. 1, however it assumed that respective images are projected by each projector 201-A, 201-B into respective projection fields 203-A, 201-B onto the surface with the respective images overlapping in blend zone 205. Furthermore, it is assumed that in blend zone 205, each projector 201 is projecting the same image. Put another way, it is assumed that for each pixel in blend zone 205, each projector 201 is projecting the same respective common image frame.

Figure 4:
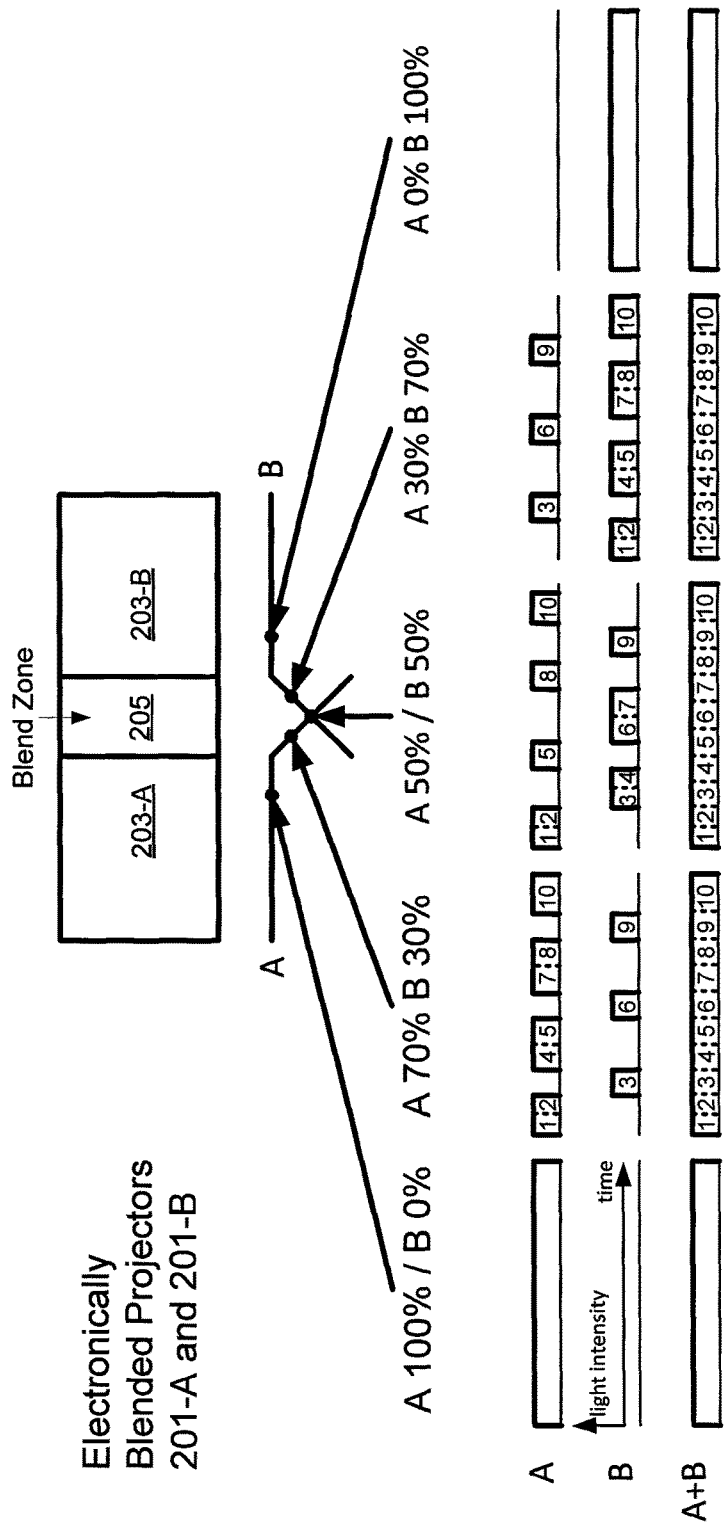
FIG. 4 depicts an example of applying the method of FIG. 3 to a two-projector system having one blend zone, according to non-limiting implementations.

It is furthermore assumed that in FIG. 4 that the brightness provided by projector 201-A decreases linearly (e.g. from left-to-right with respect to FIG. 4) across blend zone 205, and the brightness provided by projector 201-B increases linearly, (e.g. from left-to-right with respect to FIG. 4) across blend zone 205. Hence, for pixels in areas of projection field 203-A that are outside blend zone 205, projector 201-A contributes to 100% of the brightness, while projector 201-B contributes 0% of the brightness (as projector 201-B does not project into projection field 201-A other than in blend zone 205).

However, from left-to-right, as depicted, about 30% of the way into blend zone 205, projector 201-A contributes 70% of the brightness of a pixel, while projector 201-B contributes the other 30% of the brightness of the pixel; similarly, about 50% of the way into blend zone 205, projector 201-A contributes 50% of the brightness of a pixel, while projector 201-B contributes the other 50% of the brightness of the pixel; and about 70% of the way into blend zone 205, projector 201-A contributes 30% of the brightness of a pixel, while projector 201-B contributes the other 70% of the brightness of the pixel.

Finally, for pixels in areas of projection field 203-B that are outside blend zone 205, projector 201-B contributes to 100% of the brightness, while projector 201-A contributes 0% of the brightness (as projector 201-A does not project into projection field 201-B other than in blend zone 205).

Furthermore, FIG. 4 shows the effect on bitplane projection at each of these positions. In particular, it is assumed in FIG. 4 that a given pixel of a common image frame projected by each of projectors 201 in blend zone 205, is composed of 10 bitplanes, that are projected in a sequence, bitplane 1, bitplane 2, bitplane 3, bitplane 4, bitplane 5, bitplane 6, bitplane 7, bitplane 8, bitplane 9, bitplane 10 (represented as 1, 2, 3, 4, 5, 6, 7, 8, 9, 10 in FIG. 4). For example bitplane 1 can comprise a bitplane representing a most significant bit, and bitplane 10 can comprise a bitplane representing a least significant bit. Furthermore, while 10 bitplanes for each pixel are depicted, in practise, each pixel can be represented by "B" bitplanes (in this instance "B" is meant to indicate an integer number of bitplanes and not an identifier of a projector and/or a projection field), which could be $2^n$ bitplanes, where "n" is an integer.

In any event, with reference to the 70/30 region of blend zone 205 (projector 201-A providing 70% of the brightness, and projector 201-B provides the remaining 30% of the brightness), projector 201-A is controlled to project 70% (or 7) of the bitplanes in the sequence of the common image frame, and projector 201-B is controlled to project 30% (or 3) of the bitplanes in the sequence of the common image frame. In particular, the bitplanes projected by projector 201-B are complementary to the bitplanes projected by projector 201-A. Hence, for example, projector 201-A projects bitplane 1, bitplane 2, bitplane 4, bitplane 5, bitplane 7, bitplane 8, and bitplane 10 in the sequence; while projector 201-B projects complementary bitplane 3, bitplane 6, and bitplane 9 in the sequence.

In other words, projector 201-A is controlled to project a first portion of the bitplane sequence of the common image frame, and projector 201-B is controlled to project a second portion of the bitplane sequence of the common image frame, the second portion being complementary to the first portion. The result is that, in the common image frame, only one of first projector 201-A and second projector 201-B projects any given bitplane of the plurality of bitplanes of the sequence, and further only one projector 201 is projecting a bitplane for a given pixel at any given time.

Hence, there can be reduced and/or eliminated banding in blend zone 205, as compared to FIG. 1. In other words, the regions of high brightness and low brightness have been reduced and/or eliminated, and the total brightness is uniform across the frame period; for example, compare the total "A+B" brightness of this region in FIG. 4 and FIG. 1.

Similarly, in the 50/50 region of blend zone 205 (projector 201-A providing 50% of the brightness, and projector 201-B provides the remaining 50% of the brightness), projector 201-A is controlled to project 50% (or 5) of the bitplanes in the sequence of the common image frame, and projector 201-B is controlled to project 50% (or 5) of the bitplanes in the sequence of the common image frame. In particular, the bitplanes projected by projector 201-B are complementary to the bitplanes projected by projector 201-A. Hence, for example, projector 201-A projects bitplane 1, bitplane 2, bitplane 5, bitplane 8, and bitplane 10 in the sequence; while projector 201-B projects bitplane 3, bitplane 4, bitplane 6, bitplane 7, and bitplane 9 in the sequence in the sequence. Again, compared to FIG. 1, banding is reduced and/or eliminated, and the total brightness is uniform across the frame period.

Finally, the 30/70 region of blend zone 205 (projector 201-A providing 30% of the brightness, and projector 201-B provides the remaining 70% of the brightness), is similar to the 70/30 region, but with the projection of respective bitplanes by each projector 201 being reversed.

It is further appreciated that the sequence can include, but is not limited to bitplanes that have been reordered to a scheme not based solely on intensity. In other words, bitplanes of the sequences depicted in FIG. 4 can be reordered relative to an original sequence, and further some of the bitplanes of the original sequence can be turned off and/or not form part of the sequences depicted in FIG. 4. In particular, in some situations, where certain higher intensities are to be achieved, some bit planes used for lower intensities can be turned off.

In some implementations, control device 210-C transmits respective projection data to each of control devices 210-A, 210-B that has already been adapted to control each projector 201 according to method 300. For example, data indicative of a geometry of projectors 201 can be stored at memory 222-C, that enables control device 210-C to adapt respective projection data that controls each projector 201 to project according to complementary bitplanes for common image frames in blend zone 205.

However, in other implementations, control device 210-C transmits, to first control device 210-A and second control device 210-B, the common image frame and associated data indicating a respective geometry of each of first projector 201-1 and second projector 201-2 with respect to blend zone 205. As described above, data transmitted to first control device 210-A and second control device 210-B can be respective to each associated projector 201. In these implementations, each of first control device 210-A and second control device 210-B is configured to control a respective projector 201 to project a respective portion of the plurality of the bitplanes according to the respective geometry, such that in the common image frame only one of the first projector 201-A and the second projector 201-B projects any given bitplane of the plurality of bitplanes.

For example, a given combination of control device 210 and projector 201 can receive data indicative of which portion of an image is to be projected in blend zone 205 and further indicative of how many projectors are projecting into blend zone 205. In some implementations, such data can be represented by biplane coefficients (and/or blend coefficients) for each pixel of blend zone 205 in the form of a bitplane mask table, and the like.

Such data can also indicate a blending scheme, such as whether the blending is to occur linearly or according to another function, and what portion of the brightness is to be provided by a given projector 201.

Then, each combination of control device 210 and projector 201 masks (e.g. does not project) bitplanes that that are to be projected by another projector 201, even though such masked bitplanes are present at the control device 210. Put another way, one or more control devices 210 can be configured to control each of first projector 201-A and second projector 201-B to interleave the first portion and the second portion of the plurality of bitplanes according to the sequence.

Indeed, in FIG. 4, one such scheme for projecting bitplanes is shown. However, other schemes are within the scope of present implementations. For example, in some alternative implementations, such projecting of bitplanes can simply comprise projector 201-A projecting all of the first portion of bitplanes sequentially and, after all of the first portion of the bitplanes are projected by projector 201-A, projector 201-B projects all of the second portion of bitplanes sequentially. In yet other alternative implementations, projectors 201 can be controlled to alternate projecting respective bitplanes. In yet further implementations, a bitplanes can be allocated between projectors 201 in a common image frame according to a round-robin, which generally maximizes how respective light output of each projector 201 is spread out over time.

In any event, any sequence of bitplanes projected by projectors 201 in a common image frame is within the scope of present implementations as long as only one of first projector 201-A and second projector 201-B projects any given bitplane of the plurality of bitplanes in a sequence in a common image frame.

Furthermore, while method 300 is directed to a blending scheme applied to one pixel in blend zone 205, it is assumed that method 300 is applied to all the pixels in blend zone 205, a respective number of bitplanes projected in a given sequence by each projector 201 depends on a respective position of a pixel.

Hence, one or more control devices 210 is further configured to: for each of all pixels of respective common image frames projected by both first projector 201-A and second projector 201-B in blend zone 205 (all the pixels including the given pixel referred to in method 300), each of the pixels of the respective common image frames comprising a plurality of respective bitplanes arranged in a respective sequence: control first projector 201-A to project a respective first portion of the plurality of respective bitplanes according to the respective sequence; and control second projector 201-B to project a respective second portion of the plurality of respective bitplanes according to the respective sequence, the respective second portion complementary to the respective first portion, such that for each of the pixels in the respective common image frames only one of first projector 201-A and second projector 201-B projects any given respective bitplane of the plurality of respective bitplanes.

In some present implementations, method 300 can lead to brightness steps in blend zone, and when projections fields 203 do not exactly overlap (e.g. a physical registration between projectors 201 is incorrect and/or not exact), some degree of banding could still occur, though for much smaller time periods than the scheme of FIG. 1. Hence, in some implementations, blend smoothness between pixels in blend zone 205 can be addressed using dithering.

For example, in these implementations, when a target pixel intensity is no longer changed across a blend (as in FIG. 1), but bitplanes are allocated between projectors 201, as with method 300, larger steps in brightness can occur. For example, if the load time of a bitplane is 80 μsec, for a 1-chip projector with a 3000 μsec color hold time, each step when shifting which of projector 201 is displaying a most-significant-bit (MSB) bitplane will shift about 2.6% (e.g. about ~80/3000×100%) of the light from one projector 201 to another projector 201. If physical registration between projector images is incorrect, this could be visible, however dithering could be used to reduce this effect—in effect, transferring the brightness of "F" number of frames out of "D" number of frames such that the brightness shift is reduced to F/D of the bit plane step. In some instances, this could lead to synchronization of dither between projectors and/or to use of a spatial noise mask to manage dither across blend zone 205.

Figure 5:
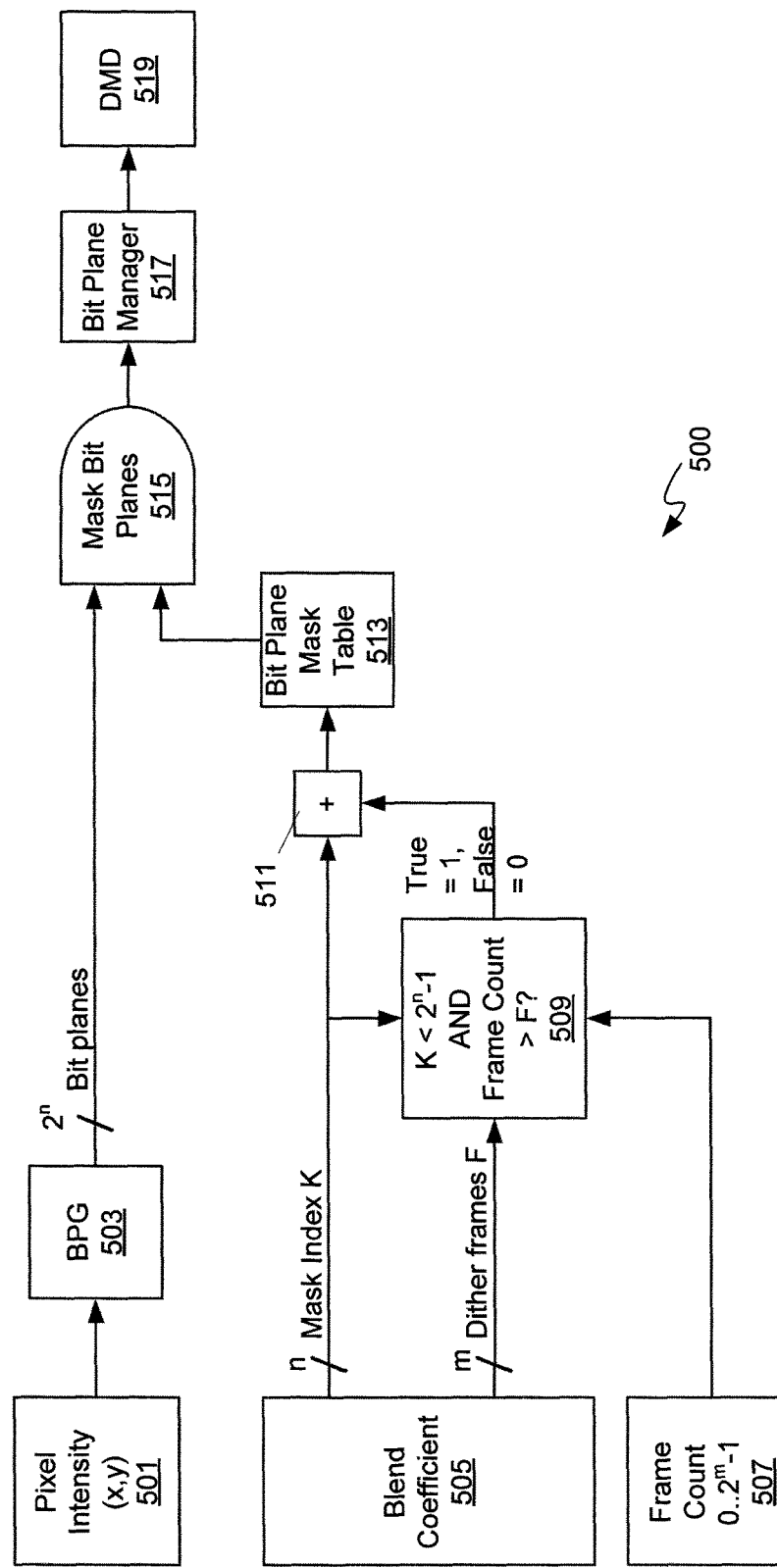
FIG. 5 depicts a scheme for implementing the method of FIG. 3 in a combination of physical and logical components, according to non-limiting implementations.

Attention is next directed to FIG. 5 which depicts a scheme 500 for implementing method 300 at system 200 and in particular depicts both physical and logical components that that can be integrated into system 200. Furthermore, scheme 500 takes into account dithering between bitplanes of adjacent pixels in blend zone 205 to increase blend smoothness. In other words, in some implementations, one or more control devices 210 can be further configured to dither bitplanes in adjacent pixels in blend zone 205, for each of first projector 201-A and second projector 201-A.

Furthermore, portions of scheme 500 can be implemented at system control device 210-C, while other portions can be implemented at a combination of a control device 210-A, 210B, and a respective projector 201-A, 201-B.

For example control device 210-C can process an image at a pixel intensity module 501 to determine pixel intensity of each pixel of the image that is to be projected (e.g. using an (x,y) coordinate system across the image). The pixel intensities are provided to a bit plane generator (BPG) 503, located, for example at a control device 210-A, 210-B, which can convert the pixel intensities into respective "B"$<=2^n$ bitplanes (rather than 10 bitplanes depicted in FIG. 4).

A blend coefficient module 505 at control device 210-C can produce a mask index K (K being a counter for pixels across blend zone 205) that is representative of the geometry between projectors 201, and for each of $2^n$ bitplanes; bitplane coefficient module 505 can also produce dithering data for dithering between $2^m$-number of frames F, which is conditionally combined with the mask index, depending on whether mask index K is less than $2^n-1$ and whether a frame count, as determined from a logical component 507, is greater than F, as determined at a logical component 509. If true, bitplane mask K+1 is selected from table 513, thus the bitplane mask is dithered between mask K and mask K+1: for F frames out of $2^m$ frames (e.g. "D" number of frames referred to above), the bitplane mask K+1 is used whereas in the remaining frames bitplane mask K is used. The dithering is used to smooth brightness steps between pixels in blend zone 205.

Bitplane mask table 513 output is combined with the respective $2^n$ bitplanes at a logical component 515 to mask the appropriate bitplanes for the blend coefficient, which produces data that enables a bitplane manager 517 to control a DMD 519 at a projector 201 (or other digitally controllable light modulator).

Persons skilled in the art will appreciate that there are yet more alternative implementations and modifications possible. For example, while implementations showing only two projectors and one blend zone are discussed, method 300 can be extended to systems with more than two projectors and/or more than one blend zone including, but not limited to, blend zones where projection fields from three or more projectors overlap. In these instances, the mask index K, for each projector would be adapted according to the geometry of the projectors such that blending of images from the three or more projectors in a respective blend zone are encoded in the mask index; such instances can include other blend zones where projection fields from two of the three or more projectors overlap, similar to that described above.

Hence, the present specification is directed to "canvases" (e.g. tiled images) created by overlapping multiple projected images projected, for example, by multiple DLP™ projectors, and addresses a problem of a viewer perceiving blend zones, where DLP™ projected images overlap due to banding as described with reference to FIG. 1.

The problem is generally addressed by methods described herein, which can include synchronization of images from the DLP™ projectors at the bitplane level, and allocation of bitplanes to each DLP™ projector within a blend zone such that at most one projector produces light during each bitplane period.

Indeed, in such synchronization, system 200 can be frame locked, however system 200 can also be bitplane locked as well, which means a common duty cycle and hold time across all projectors 201. Without bitplane locking, artifacts can still be reduced, but not necessarily as effectively as described with respect to FIG. 4 (though still more effective than the scheme of FIG. 1).

Bitplane allocation generally occurs as described herein so that, at most one projector is illuminating a bitplane, regardless of blend zone, including where more than two projectors overlap, for example in systems that comprise more than two projectors. Hence, a blend coefficient generator (e.g. blend coefficient module 505) can be generally configured with a physical system configuration (e.g. which projectors have adjacent and/or overlapping projection fields) and can hence allocate complementary bitplanes to each. In some implementations, this can be achieved using a blend projector identifier, which, for four projectors, can be nine values: ½, 2/2, ⅓, ⅔, 3/3, ¼, 2/4, ¾, 4/4. The identifier indicates which portion of a plurality of bitplanes are to be projected by a given projector of the four projectors. For example, a blend projector identifier of x/4 indicates a blend where images from 4 projectors overlap, so the bitplanes are divided into four portions, and a blend projector identifier of ¼ indicates that the given projector should project only the first portion, a blend projector identifier of ¾ indicates that the given projector should project only the second portion, etc. The blend coefficient in these implementations could then indicate the allocation of bitplanes to each projector.

In other words, method 300 can be extended to a plurality of projectors (e.g. more than two projectors); for example, system 200 can further comprise a plurality of projectors, including first projector 201-A and second projector 201-B, each having a respective projection field which at least partially overlap in a blend zone, a given pixel of a common image frame projected by each of the plurality of projectors in the blend zone, the given pixel of the common image frame comprising the plurality of bitplanes arranged in a sequence, the one or more control devices 210 (which can include control devices at each of the plurality of projectors) being further configured to: control each of the plurality of projectors to project a respective portion of the plurality of bitplanes according to the sequence, each of the respective portions being complementary to all others of the respective portions, such that in the common image frame only one of the plurality of projectors projects any given bitplane of the plurality of bitplanes. One or more blend projector identifiers can be transmitted to each of the plurality of projectors to indicate portions of an image being projected by a given projector that overlap in a blend zone. Indeed, the one or more blend projector identifiers transmitted to each of the plurality of projectors can be respective to a given projector to identify a respective geometry thereof. Furthermore, such a system can comprise more than one blend zone; for example, in the four projector system described above, there can be a plurality of blend zones in which projection fields of pairs of the plurality of projectors overlap, in different combinations, another plurality of blend zones in which projection fields of three of the four of projectors overlap, in different combinations, and a blend zone in which projection fields of all four of projectors overlap (however, when a surface and/or a screen, and the like, onto which images are projected is not flat there could be a plurality of blend zones in which projection fields of all four of projectors overlap).

In yet further implementations, control device 210-C can transmit associated data indicating a respective geometry to each of control devices 210-A, 210-B and associated projectors 201 (and/or each of a plurality of projectors and associated control devices), for example during a setup process, and then control device 210-C can be disconnected from other components in system 200. In other words, control device 210-C need not be in continuous communication with projectors of system 200, and only in communication during the setup process. Projectors 210 of system 200 (and/or associated control devices 210 (other than control device 210-C)) can then proceed to divvy up the bit planes according to method 300 and/or according to a respective application 223. In other words, geometry data (such as blend projector identifiers) can be stored at each projector and need not be continuously updated from an image generator (such as control device 210-C and the like).

Furthermore, as content can be distributed from control device 210-C to the projectors and/or to the other control devices, whether control device 210-C is in continuous or non-continuous communication therewith, system 200 can comprise a content distribution system. Hence, method 300 can comprise a method implemented in content distribution system comprising two or more projectors and one or more control devices.

It is yet further appreciated that techniques described herein can be used in other applications, for example at a pulsed width modulation (PWM) type image modulator; in other words, PWM duty cycles could be managed using method 300 presuming a sufficient number of "bitplanes" is used to cover time slices created by the smallest allowed change in PWM duty cycle.

In any event, provided herein is a system and method reducing blend artifacts in a multiple digital projector system. In particular, projectors in the system are coordinated such that bitplanes in blend zones are projected by one projector at one time, the bitplanes of a pixel distributed between the projectors such that only projector is projecting a given bitplane of a given pixel at any given time.

Those skilled in the art will appreciate that in some implementations, the functionality of control devices 210 can be implemented using pre-programmed hardware or firmware elements (e.g., application specific integrated circuits (ASICs), electrically erasable programmable read-only memories (EEPROMs), etc.), or other related components. In other implementations, the functionality of control devices 210 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A system comprising:
a first projector having a first projection field and a second projector having a second projection field, the first projection field and the second projection field overlapping in a blend zone, each of the first projector and the second projector comprising a respective digital projector configured to: digitally project images where each projector pixel is either on or off at any given time; and control brightness of pixels in projected images using bitplanes; and
one or more control devices configured to:
for a given pixel of a common image frame projected by both the first projector and the second projector in the blend zone, the given pixel of the common image frame provided by a plurality of bitplanes each representing a different significant bit of pixel intensity of the given pixel, the plurality of bitplanes arranged in a sequence, control the first projector to project a first portion of the plurality of bitplanes in the sequence; and
control the second projector to project a second portion of the plurality of bitplanes in the sequence, the second portion complementary to the first portion, only one of the first projector and the second projector projecting any given bitplane in the sequence in the common image frame at any given time, the sequence being otherwise common to the first projector and the second projector in the blend zone, a first number of the bitplanes in the first portion, and a second number of the bitplanes in the second portion, each being dependent on a position of the given pixel in the blend zone, the first number being larger than the second number when the position is towards the first projection field, with respect to a center of the blend zone, and the second number being larger than the first number when the position is towards the second projection field, with respect to the center of the blend zone,
wherein a portion of an image to be projected in the blend zone and a number of projectors are projecting into the blend zone is represented by blend coefficients for pixels across the blend zone in a form of a bitplane mask table, the one or more control devices are further configured to dither brightness of frames in the blend zone by:
converting pixel intensities of the pixels in the image into the plurality of bitplanes, a number of the plurality of bitplanes being $2^n$, where "n" is an integer;
producing a mask index K, where K is a counter for the pixels across the blend zone, the mask index K representative of geometry between the first projector and the second projector and each of the $2^n$ bitplanes;
producing dithering data for dithering between an F number of frames;
when the mask index K is less than $2^n-1$ and when a frame count is greater than the F number of frames, select a bitplane mask K+1 from the bitplane mask table and otherwise select a bitplane mask K, to dither between the bitplane mask K and the bitplane mask K+1; and
combining a selected bitplane mask with a respective bitplane of the plurality of bitplanes to control a respective light modulator at the first projector and the second projector.

2. The system of claim 1, wherein the one or more control devices comprises a first control device at the first projector, a second control device at the second projector, and one or more system control devices in communication with the first control device and the second control device, the one or more system control devices configured to:
transmit, to the first control device and the second control device, the common image frame and associated data indicating a respective geometry of each of the first projector and the second projector with respect to the blend zone, each of the first control device and the second control device configured to control a respective projector to project a respective portion of the plurality of the bitplanes according to the respective geometry.

3. The system of claim 1, wherein each of the first projector and the second projector are controlled to project a respective portion of the plurality of bitplanes in the sequence according to a blend coefficient determined from associated data indicating a respective geometry of each of the first projector and the second projector with respect to the blend zone.

4. The system of claim 1, wherein the one or more control devices are further configured to:
for each of all pixels of the common image frame projected by both the first projector and the second projector in the blend zone, all the pixels including the given pixel, each of the pixels of the common image frame comprising a plurality of respective bitplanes arranged in a respective sequence:
control the first projector to project a respective first portion of the plurality of respective bitplanes according to the respective sequence; and
control the second projector to project a respective second portion of the plurality of respective bitplanes according to the respective sequence, the respective second portion complementary to the respective first portion, and for each of the pixels in the common image frame only one of the first projector and the second projector projects any given respective bitplane in the respective sequence.

5. The system of claim 1, wherein the one or more control devices are further configured to control each of the first projector and the second projector to interleave the first portion and the second portion of the plurality of bitplanes in the sequence.

6. The system of claim 1, wherein the one or more control devices are further configured to dither adjacent bitplanes for each of the first projector and the second projector in the blend zone.

7. The system of claim 1, wherein each of the first projector and the second projector comprise one or more of a a DMD (digital multimirror projector) based projector and an LCOS (liquid crystal on silicon) projector operated in an on-off mode.

8. The system of claim 1, wherein each of the first projector and the second projector is configured to mask respective bitplanes in the sequence that are not to be respectively projected.

9. The system of claim 1, wherein each of the first projector and the second projector are controlled to project a respective portion of the plurality of bitplanes in the sequence according to a round-robin.

10. The system of claim 1, further comprising a plurality of projectors, including the first projector and the second projector, each having a respective projection field which at least partially overlap in the blend zone, the given pixel of the common image frame projected by each of the plurality of projectors in the blend zone, the given pixel of the common image frame comprising the plurality of bitplanes arranged in the sequence, the one or more control devices are further configured to:

control each of the plurality of projectors to project a respective portion of the plurality of bitplanes according to the sequence, each of the respective portions being complementary to all others of the respective portions, only one of the plurality of projectors projecting any given bitplane in the sequence in the common image frame at any given time.

11. A method comprising:

at a system comprising: a first projector having a first projection field and a second projector having a second projection field, the first projection field and the second projection field overlapping in a blend zone, each of the first projector and the second projector comprising a respective digital projector configured to: digitally project images where each projector pixel is either on or off at any given time; and control brightness of pixels in projected images using bitplanes; and one or more control devices, for a given pixel of a common image frame projected by both the first projector and the second projector in the blend zone, the given pixel of the common image frame provided by a plurality of bitplanes each representing a different significant bit of pixel intensity of the given pixel, the plurality of bitplanes arranged in a sequence, controlling, using the one or more control devices, the first projector to project a first portion of the plurality of bitplanes in the sequence; and controlling, using the one or more control devices, the second projector to project a second portion of the plurality of bitplanes in the sequence, the second portion complementary to the first portion, only one of the first projector and the second projector projecting any given bitplane in the sequence in the common image frame at any given time, the sequence being otherwise common to the first projector and the second projector in the blend zone, a first number of the bitplanes in the first portion, and a second number of the bitplanes in the second portion, each being dependent on a position of the given pixel in the blend zone, the first number being larger than the second number when the position is towards the first projection field, with respect to a center of the blend zone, and the second number being larger than the first number when the position is towards the second projection field, with respect to the center of the blend zone, wherein a portion of an image to be projected in the blend zone and a number of projectors are projecting into the blend zone is represented by blend coefficients for pixels across the blend zone in a form of a bitplane mask table, wherein the method further comprises dithering brightness of frames in the blend zone by:

converting pixel intensities of the pixels in the image into the plurality of bitplanes, a number of the plurality of bitplanes being $2^n$, where "n" is an integer;

producing a mask index K, where K is a counter for the pixels across the blend zone, the mask index K representative of geometry between the first projector and the second projector and each of the $2^n$ bitplanes;

producing dithering data for dithering between an F number of frames;

when the mask index K is less than $2^n-1$ and when a frame count is greater than the F number of frames, select a bitplane mask K+1 from the bitplane mask table and otherwise select a bitplane mask K, to dither between the bitplane mask K and the bitplane mask K+1; and combining a selected bitplane mask with a respective bitplane of the plurality of bitplanes to control a respective light modulator at the first projector and the second projector.

12. The method of claim 11, wherein the one or more control devices comprises a first control device at the first projector, a second control device at the second projector, and one or more system control devices in communication with the first control device and the second control device, the method further comprising:

transmitting, using the one or more system control devices, to the first control device and the second control device, the common image frame and associated data indicating a respective geometry of each of the first projector and the second projector with respect to the blend zone, each of the first control device and the second control device configured to control a respective projector to project a respective portion of the plurality of the bitplanes according to the respective geometry.

13. The method of claim 11, wherein each of the first projector and the second projector are controlled to project a respective portion of the plurality of bitplanes in the sequence according to a blend coefficient determined from associated data indicating a respective geometry of each of the first projector and the second projector with respect to the blend zone.

14. The method of claim 11, further comprising:

for each of all pixels of the common image frame projected by both the first projector and the second projector in the blend zone, all the pixels including the given pixel, each of the pixels of the common image frame comprising a plurality of respective bitplanes arranged in a respective sequence:

controlling, using the one or more control devices, the first projector to project a respective first portion of the plurality of respective bitplanes according to the respective sequence; and controlling, using the one or more control devices, the second projector to project a respective second portion of the plurality of respective bitplanes according to the respective sequence, the respective second portion complementary to the respective first portion, and for each of the pixels in the common image frame only one of the first projector and the second projector projects any given respective bitplane in the respective sequence.

15. The method of claim 11, further comprising controlling, using the one or more control devices, each of the first projector and the second projector to interleave the first portion and the second portion of the plurality of bitplanes in the sequence.

16. The method of claim 11, further comprising dithering, using the one or more control devices, adjacent bitplanes for each of the first projector and the second projector in the blend zone.

17. The method of claim 11, wherein each of the first projector and the second projector is configured to mask respective bitplanes in the sequence that are not to be respectively projected.

18. The method of claim 11, wherein each of the first projector and the second projector are controlled to project a respective portion of the plurality of bitplanes in the sequence according to a round-robin.

19. The method of claim 11, wherein the system further comprises a plurality of projectors, including the first projector and the second projector, each having a respective projection field which at least partially overlap in the blend zone, the given pixel of the common image frame projected by each of the plurality of projectors in the blend zone, the given pixel of the common image frame comprising the plurality of bitplanes arranged in the sequence, the method further comprising:
controlling, using the one or more control devices, each of the plurality of projectors to project a respective portion of the plurality of bitplanes according to the sequence, each of the respective portions being complementary to all others of the respective portions, only one of the plurality of projectors projecting any given bitplane in the sequence in the common image frame at any given time.

20. A non-transitory computer-readable medium storing a computer program, wherein execution of the computer program is for:
at a system comprising: a first projector having a first projection field and a second projector having a second projection field, the first projection field and the second projection field overlapping in a blend zone, each of the first projector and the second projector comprising a respective digital projector configured to: digitally project images where each projector pixel is either on or off at any given time; and control brightness of pixels in projected images using bitplanes; and one or more control devices, for a given pixel of a common image frame projected by both the first projector and the second projector in the blend zone, the given pixel of the common image frame provided by a plurality of bitplanes each representing a different significant bit of pixel intensity of the given pixel, the plurality of bitplanes arranged in a sequence, controlling, using the one or more control devices, the first projector to project a first portion of the plurality of bitplanes in the sequence; and
controlling, using the one or more control devices, the second projector to project a second portion of the plurality of bitplanes in the sequence, the second portion complementary to the first portion, only one of the first projector and the second projector projecting any given bitplane in the sequence in the common image frame at any given time, the sequence being otherwise common to the first projector and the second projector in the blend zone, a first number of the bitplanes in the first portion, and a second number of the bitplanes in the second portion, each being dependent on a position of the given pixel in the blend zone, the first number being larger than the second number when the position is towards the first projection field, with respect to a center of the blend zone, and the second number being larger than the first number when the position is towards the second projection field, with respect to the center of the blend zone,
wherein a portion of an image to be projected in the blend zone and a number of projectors are projecting into the blend zone is represented by blend coefficients for pixels across the blend zone in a form of a bitplane mask table, and wherein execution of the computer program is for further dithering brightness of frames in the blend zone by:
converting pixel intensities of the pixels in the image into the plurality of bitplanes, a number of the plurality of bitplanes being $2^n$, where "n" is an integer;
producing a mask index K, where K is a counter for the pixels across the blend zone, the mask index K representative of geometry between the first projector and the second projector and each of the $2^n$ bitplanes;
producing dithering data for dithering between an F number of frames;
when the mask index K is less than $2^n-1$ and when a frame count is greater than the F number of frames, select a bitplane mask K+1 from the bitplane mask table and otherwise select a bitplane mask K, to dither between the bitplane mask K and the bitplane mask K+1; and
combining a selected bitplane mask with a respective bitplane of the plurality of bitplanes to control a respective light modulator at the first projector and the second projector.

* * * * *